United States Patent [19]
Fisher

[11] 3,799,527
[45] Mar. 26, 1974

[54] SUSPENSION ASSEMBLY FOR METAL TREATING VESSEL

[75] Inventor: Howard M. Fisher, New Castle, Pa.

[73] Assignee: Pennsylvania Engineering Corporation, Pittsburgh, Pa.

[22] Filed: May 1, 1972

[21] Appl. No.: 249,347

[52] U.S. Cl. .............................. 266/36 P
[51] Int. Cl. .............................. C21c 5/50
[58] Field of Search .............. 266/35, 36 P, 36 H

[56] References Cited
UNITED STATES PATENTS

| | | | |
|---|---|---|---|
| 3,561,744 | 2/1971 | Altman | 266/36 P |
| 3,182,979 | 5/1965 | Krause | 266/35 |
| 3,201,108 | 8/1965 | Kramer | 266/36 P |
| 3,251,589 | 5/1966 | Hofmann et al. | 266/36 P |
| 3,288,453 | 11/1966 | Buesing et al. | 266/36 P |
| 3,454,269 | 7/1969 | Falk | 266/36 P |
| 3,653,648 | 4/1972 | Mevissen et al. | 266/36 P |
| 3,653,649 | 4/1972 | Mevissen et al. | 266/36 P |

*Primary Examiner*—Gerald A. Dost
*Attorney, Agent, or Firm*—Fred Wiviott; Ralph G. Hohenfeldt

[57] ABSTRACT

An open topped vessel for treating molten steel is supported on a trunnion ring for pivotal movement about a horizontal axis. Tuyeres are provided in the vessel for feeding gases upwardly through the molten metal. A quick release assembly permits the rapid detachment of the vessel from the trunnion ring and supports the vessel in a centralized position relative to the ring regardless of thermal expansion.

19 Claims, 7 Drawing Figures

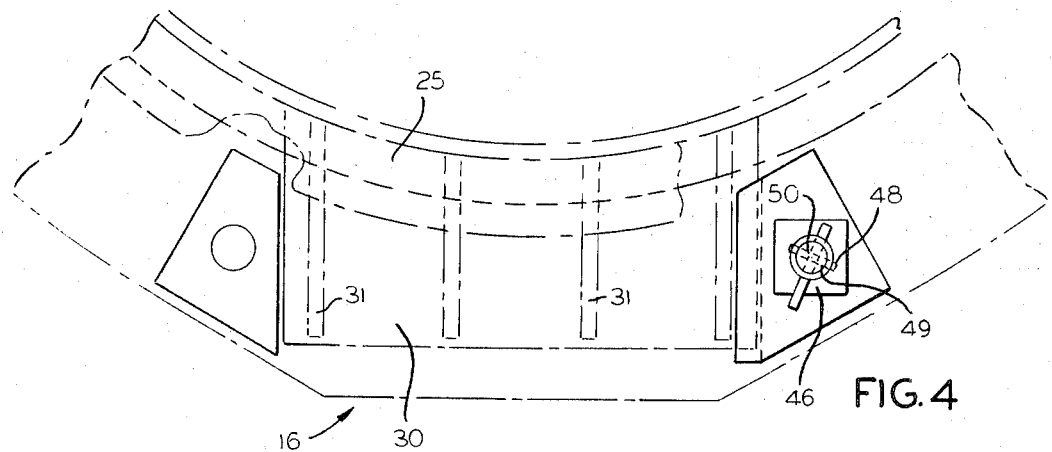
FIG.4
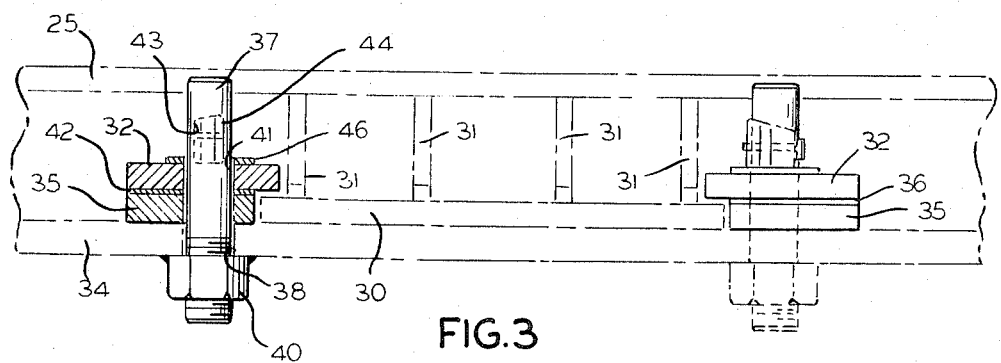
FIG.3
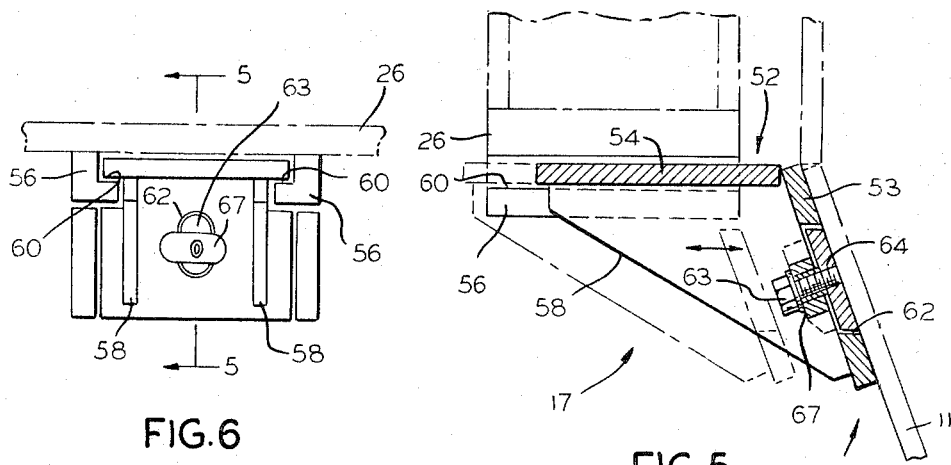
FIG.6
FIG.5
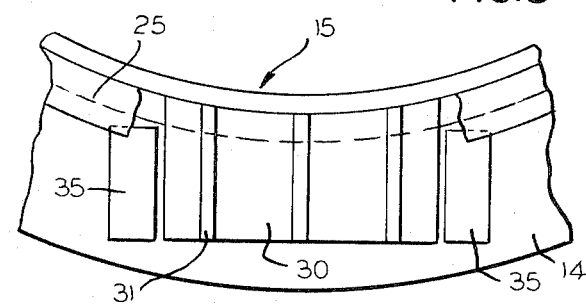
FIG.4A

SUSPENSION ASSEMBLY FOR METAL TREATING VESSEL

BACKGROUND OF THE INVENTION

One well-known method of refining metals, such as steel, is in a basic oxygen furnace wherein pure oxygen is blown onto the top surface of the hot metal by means of an oxygen lance inserted through the open top of the vessel. This process, however, results in a substantial chromium loss so that a chromium addition is necessary after the oxygen reaction is completed. The bottom-blown reaction vessels have been developed to overcome these disadvantages in the BOF process. In such reactors oxygen and other gases, such as argon or propane, are simultaneously injected into the vessel and below the level of molten metal. In argon-oxygen reactors, the argon suppresses the reaction of chromium and oxygen so that the carbon level can be reduced to the desired level without substantial loss of chromium. Propane is used in certain bottom blown reactors to prolong refractory life. It is often necessary to change reactor vessels when treating melts of different sizes or melts of different metallurgical compositions. The prior art method of supporting reactor vessels of this type, which consisted of the plurality of support arms radiating from the vessel and connected by swing bolts to the surrounding trunnion ring, was not wholly satisfactory however because it did not permit rapid removal of the vessel from the trunnion ring. In addition, prior art methods of supporting reactor vessels tended to result in substantial stresses in the supporting trunnion ring, the vessel and the support assembly under conditions of thermal expansion and contraction.

SUMMARY OF THE INVENTION

A general object of the invention is to provide a new and improved suspension assembly for reactor vessels.

Another object of the invention is to provide a suspension assembly for reactor vessels which permits rapid connection and disconnection to a supporting trunnion ring.

A further object of the invention is to provide a reactor vessel support assembly which permits substantial exapnsion of the reactor vessel without inducing inordinate stresses in the trunnion ring, vessel or support assembly.

Yet another object of the invention is to provide a reactor vessel support assembly which permits the vessel to remain in a centralized position relative to the trunnion ring during tilting.

A still further object of the invention is to provide a reactor vessel support assembly which permits expansion of the vessel within the trunnion ring while supporting the vessel firmly in all positions and prevents movement of the vessel relative to the trunnion ring during rotation thereof.

These and other objects and advantages of the instant invention will become more apparent from the detailed description thereof taken with the accompanying drawings.

In general terms, the invention comprises an open topped metal treating vessel, a first means secured to the vessel for engaging the upper surface of a trunnion ring to support the vessel in its vertical position, and support means engaging the upper and lower surfaces of the ring and being quickly attachable and detachable from the vessel for supporting the vessel in its tilted position and for releasably coupling the vessel to the ring.

BRIEF DESCRIPTION OF THE DRAWINGS

FIG. 3 illustrates one of the vessel trunnion ring top engaging assemblies in greater detail;

FIG. 4 is a top view of the trunnion ring top engaging assembly shown in FIG. 3 with parts broken away;

FIG. 4a illustrates another one of the vessel trunnion ring top engaging assemblies in greater detail;

FIG. 5 is a view taken along line 5—5 of FIG. 6; and

FIG. 6 illustrates one of the trunnion ring bottom support assemblies in greater detail.

DESCRIPTION OF THE PREFERRED EMBODIMENT

Figure 1:
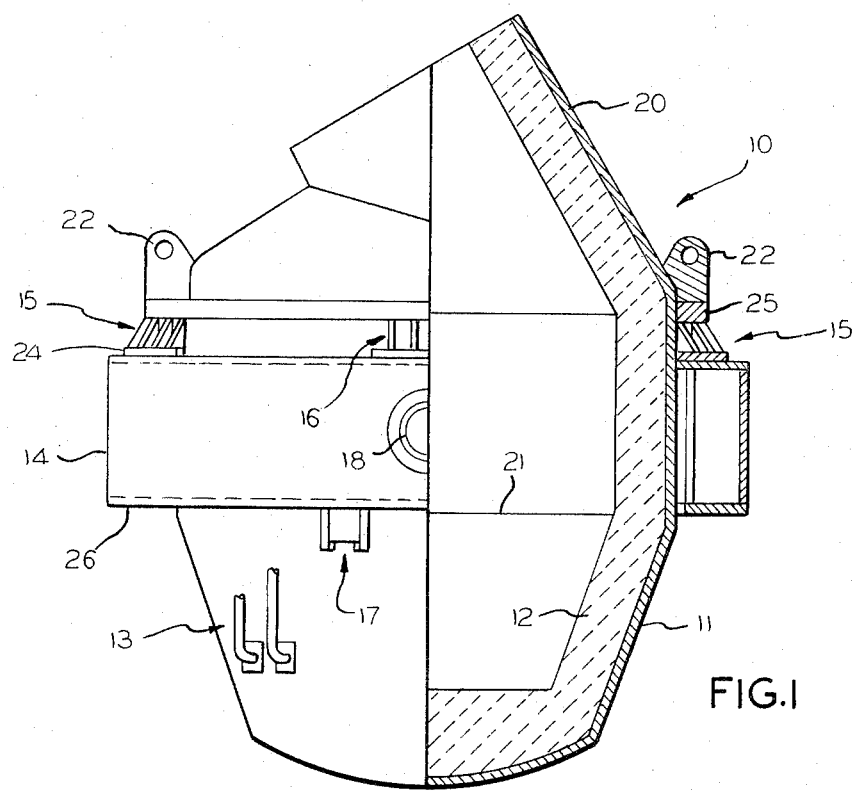
FIG. 1 is a front elevational view of a metal treating vessel having the support means according to the present invention.

The invention will be illustrated in connection with the vessel 10 shown in FIG. 1 to be opened at its upper end and to include a metallic shell 11 in a refractory lining 12. One or more tuyeres 13 are provided in the lower end of the vessel to permit the injection of gases, such as oxygen and argon below the level of the molten metal bath by means which are well known in the art and which will not be discussed in detail for the sake of brevity. As those skilled in the art will appreciate that the tuyeres 13 may be located in the side of the vessel, as seen in FIG. 1 or in the bottom as in bottom blown vessels.

The vessel 10 is supported on a trunnion ring 14 by means of a plurality of upper and lower trunnion ring support assemblies 15, 16 and 17. A trunnion 18 extends from each of the opposite sides of the trunnion ring 14 and each is supported in a well known manner on bearing structures (not shown). One of the trunnions 18 is also coupled to a suitable drive mechanism (not shown) for tilting the vessel 10 to various positions to permit charging, deslagging, sampling, temperature measurement, or discharge of hot metal through a pouring spout 20.

The vessel 10 will normally be charged with hot metal to approximately a line 12 shown in FIG. 1. In the case of an argon-oxygen converter, oxygen and argon are normally introduced through the tuyere system 13 to perform the conversion operation. If it becomes necessary to treat a different size melt or if a melt having a different metallurgical composition is to be treated, the vessel 10 must be removed from the trunnion ring 14 and a new vessel inserted in its place. Toward this end the vessel support assemblies 15, 16 and 17 are released in a manner which will be discussed more fully hereinbelow. The vessel 10 is then lifted away from the trunnion ring 14 by any suitable means, such as a crane and cables (not shown) which are engagable with lifting lugs 22 formed on a support ring 24 secured to shell 11. The correct size vessel or a vessel having a new lining or a lining which previously has been used to treat the same metallurgical composition can then be placed in position within the trunnion ring 14 and the quick attachment and the detachment assemblies 15, 16 and 17 are then operated to secure vessel 10 to ring 14.

Figure 2:
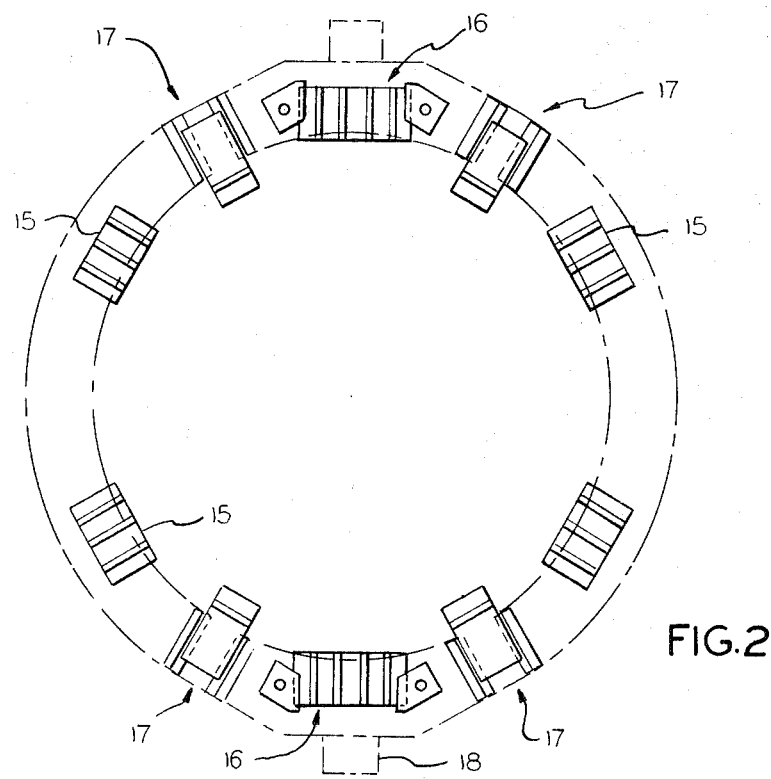
FIG. 2 is top plane view showing the trunnion ring and vessel support system.

As seen in FIGS. 1 and 2, the vessel 10 is mounted on the trunnion ring 14 by means of a plurality of spaced apart upper suspension assemblies 15, 16 and lower stabilizer assemblies 17. While the preferred embodiment of the invention is shown in FIGS. 1 and 2 to include four upper suspension assemblies, 15, two upper assemblies 16 and four lower suspension assemblies 17, the actual number of each will be governed by the size and weight of the vessel 10 being supported. Preferably, the four upper assemblies 15 are displaced at radial angles of substantially 60° on the opposite sides of the trunnions 18 and the assemblies 16 being substantially in line with the trunnions 18. In addition, a pair of lower stabilizer assemblies 17 are preferably located in spaced relation on the opposite sides of each of the trunnions 18 and located at radial angles of 30° on the opposite sides of trunnions 18.

As seen in FIGS. 1, 3 and 4, the upper suspension assemblies 15 and 16 are engagable with the upper flange 24 of trunnion ring 14 and are affixed to a ring 25 which is secured to the shell 11 of vessel 10 adjacent its upper end. As will be described more fully below, the lower stabilizer assemblies 17 are fixed to the lower flange 26 of trunnion ring 14 and include means for releasably engaging the sides of shell 11.

Referring now to FIGS. 3 and 4, each of the upper suspension assemblies 15 and 16 is shown to include a bracket plate 30 affixed to the ring 25 by a plurality of vertically extending ribs 31. As indicated hereinabove, each of the plates 30 engage the upper flange 24 of trunnion ring 14 to support the vessel 10 when the latter is in its vertical position shown in FIG. 1. Each of the suspension assemblies 16 also includes a pair of gib plates 32 which are removably coupled to the upper trunnion ring flange 34 and overlay one of the opposite ends of their associated bracket plate 30. The gib plates 32 prevent displacement of the vessel 10 when it is in a tilted position.

As seen in FIG. 3, each gib plate 32 is mounted in spaced relation above the trunnion ring flange 24 by means of a stop block 35 affixed to flange 24 and having substantially the same thickness as the bracket plate 30. A pin 37 extends upwardly through aligned apertures 38 and 39 in the trunnion ring flange 24 and stop block 34. The lower end of pin 37 threadably engages a nut 40 affixed to the lower surface of flange 24 and in registry with aperture 38. The gib plate 32 is also provided with an aperture 41 for being received on pin 37. Preferably a shim 42 is disposed between the gib plate 32 and stop block 34.

An axially extending tapered slot 43 is formed through pin 37 for receiving a wedge 44. A second apertured shim 46 may be disposed between the wedge 44 and the stop block 32. The wedge 44 retains the gib plate 32 in a blocking relation to the bracket plate 30 so that the latter is held in position during rotation of the vessel 10. In order to prevent the accidental dislodgment of the wedge 44, a pin 48 is disposed in transverse apertures 49 and 50 formed in the pin 37 and wedge 44, respectively.

The assemblies 15 are shown in FIG. 4a to be similar to the assemblies 16 in that they include the bracket plate 30 affixed to ring 25 by ribs 31 and stop plates 35 located on either side of bracket plate 30. The assemblies 15, however, do not include the gib plates 32 and their mounting assemblies. The assemblies 15 act to support the vessel 10 on the trunnion ring 14 and to prevent rotation of vessel 10 relative to ring 14 when the vessel is tilted.

Referring now specifically to FIGS. 5 and 6, the lower stabilizer assemblies 17 each shown to include a stabilizer bracket 52 slidably supported below the trunnion ring flange 24 for movement into and out of engagement with the shell 11 of vessel 10. Bracket 52 includes a first plate 53 for bearing against the shell 11 and a second plate 54 slidably supported beneath the lower trunnion ring flange 26 by a pair of rails 56. The plates 53 and 54 are joined at an obtuse angle by brace members 58 whereby the plate 53 may bear against the inclined surface of vessel 10 while plate 54 is disposed in a substantially horizontal position. The rails 56 are each elongated and generally L-shaped in vertical cross section and their upper edges are affixed in an inwardly facing relation to the lower trunnion ring flange 24. The plate 54 and hence the bracket 52 is slidably mounted on the inner surfaces 60 of rails 56 for lateral movement toward and away from vessel 10.

A generally obround aperture 62 is formed in plate 53 for receiving a similarly shaped but somewhat smaller member 63 affixed to vessel shell 11. Member 63 has a threaded aperture 64 for receiving a bolt 66 which serves to retain an obround washer 67. When the vessel 10 is in its operative position, the major axes of the aperture 62 and the member 63 are oriented generally vertically while that of the washers 67 are normally oriented horizontally to prevent movement of the bracket 52 away from the vessel 10.

As those skilled in the art will appreciate, the vessel 10 must be removed from the trunnion ring 14 from time to time and replaced by another vessel. For example, it may be necessary to remove the vessel for relining or it may be necessary to substitute another vessel when a different alloy is to be treated so that metallic residue in the lining will not contaminate the new melt. Further, each size vessel will have an optimum bath depth so that the vessel should be changed when substantially different size melts are to be treated.

When the vessel 10 is secured, the various components of the attachment assemblies 16 and 17 are in their positions shown by full lines and FIGS. 3, 4, 5 and 6. Should it become necessary to remove the vessel 10, the transverse pins 48 are first removed from each of the upper support assemblies 16. The wedges 44 are then removed from the slots 43 whereupon the gib plates 32 and shims 46 may be removed. In addition, each of the bolts 63 of the lower stabilizer assemblies 17 are loosened and the obround washers 67 are rotated 90° into coincidence with the openings 62 in plates 53. The bracket members 52 are then free to be moved away from the vessel 10 and from a position shown by full lines in FIG. 5 to a position by phantom lines. When all of the upper and support assemblies 16 and the lower stabilizer assemblies 17 have thus been released, the vessel 10 may be lifted out from the trunnion ring 14 by means of the lifting lugs 22. A new vessel 10 may then be lowered on to the trunnion ring 14 and reattached by a reversal of the process just described. This quick attachment and detachment of the vessel facilitates rapid vessel replacement so that the equipment can be utilized to the fullest extent possible. It also minimizes the time for which other expensive equipment such as melting furnaces and casting machinery would be idled by lengthy vessel replacement operations.

When the vessel 10 is secured to the trunnion ring 14, the bracket plates 30 and the bracket members 52 are secured to the vessel and, in effect, slidably engage the trunnion ring flange 24. This permits local expansion and contraction of the vessel without inducing undue stresses in the attachment assemblies and the trunnion ring. In addition, this structure functions to hold the vessel in a generally centralized spaced relation to the trunnion ring 14. Further engagement between the attachment assemblies and the vessel above and below the trunnion ring eliminates any relative axial movement between the vessel and trunnion ring to thereby minimize shock loading on the trunnion ring and shell 10 during rotation of the vessel.

Those skilled in the art will appreciate that while the invention has been illustrated with respect to one particular type of metal conversion vessel, it has application to other conversion vessels, such as bottom blown and BOF, as well. Further, while the trunnion ring 14 is shown to have a generally rectangular configuration in vertical cross section, it may have any convenient configuration. Accordingly, while only the single embodiment of the invention has been shown and described, it is not intended to be limited thereby but only by the scope of the appended claims.

I claim:

1. A metal treating vessel,
   support means adjacent said vessel and adapted to be pivoted, said support means including a member surrounding said vessel,
   attachment means for securing said vessel to said support means and for retaining said vessel in position relative to said support means during pivotal movement thereof,
   said attachment means including a first plurality of members affixed to and spaced apart on one of said vessel and support means,
   a second plurality of members releasably mountable on the other one of said vessel and support means and each releasably engagable with one of said first plurality of members to permit limited movement of said first members radially relative to said support means and for preventing longitudinal movement of said vessel relative to said support means,
   said second plurality of members being quickly releasable out of engagement with said first members to permit relative axial movement of said vessel and support means,
   said attachment means also including a third plurality of members movably mounted on said vessel surrounding member for movement into and out of supporting engagement with said vessel at a point displaced axially relative to the first plurality of members, and locking means for releasably holding said third plurality of members in engagement with the said vessel.

2. The combination set forth in claim 1 wherein said first plurality of members have a first side slidably engagable with the one of said vessel and support means and said second plurality of members being engagable with an opposite side of said first plurality of members.

3. The combination set forth in claim 2 wherein said first plurality of members being disposed on said vessel and having their first sides in engagement with said support member, said second plurality of members engaging the other sides of said first plurality of members.

4. The combination set forth in claim 3 wherein said support member includes a pair of spaced surfaces extending generally radially relative to said vessel, said surfaces being generally horizontal and arranged one above the other when said vessel is in a generally vertical position to define upper and lower surfaces, said first plurality of members engaging the upper one of said surfaces and the third plurality of members engaging the lower one of said surfaces.

5. The combination set forth in claim 4 wherein said first plurality of members comprising plate means secured to said vessel and having one side engaging said upper surface, and means mounted on said support member for releasably holding said second plurality of members against the other side of said plate means.

6. The combination set forth in claim 5 wherein said third plurality of members includes a first portion slidably mounted on the lower one of said surfaces and second portion engagable with said vessel and movable means on said vessel and adjacent each of said second portions having a first position for preventing movement of its respective second and third members away from said vessel and a second position permitting sliding movement of its associated third member away from said vessel.

7. A metal treating vessel,
   support means adjacent said vessel and adapted to be pivoted about a substantially horizontal axis, said support means having first means defining a support surface when said vessel is in an untilted position,
   attachment means for retaining said vessel in position relative to said support means during pivotal movement thereof,
   said attachment means including a first plurality of members affixed to said vessel in a spaced apart relation and having a first surface and a second surface spaced from said first surface, said first surfaces being slidably engagable with said support surface,
   a second plurality of members, quick attachment means for releasably mounting said second plurality of members on said support means and in engagement with the second surface of at least some of said first plurality of members, each of said second members being slidably engagable with their associates ones of said first plurality of members to permit limited sliding movement of said first members on said support surface and radially relative to said vessel during thermal expansion and contraction of said vessel relative to said support means and for preventing longitudinal movement of said vessel relative to said support means,
   said second plurality of members being located relative to the first plurality of members and said axis to prevent lateral movement of said vessel when said support means is pivoted,
   said quick attachment and detachment means securing said second plurality of members solely to said support means.

8. The combination set forth in claim 7 wherein said attachment means includes a third plurality of members mounted in spaced relation on the support means and movable into and out of supporting engagement with said vessel at a point displaced axially relative to the first plurality of members, and locking means for releasably holding said third plurality of members in engagement with said vessel and,
said second and third attachment means being arranged to prevent movement of said vessel in a direction normal to said axis and relative to said support means when said support means is tilted.

9. The combination set forth in claim 8 wherein said support means includes a member surrounding said vessel, said third plurality of members being movably mounted on said vessel surrounding member for movement into and out of engagement with said vessel.

10. The combination set forth in claim 9 wherein said support member includes a pair of spaced surfaces extending generally radially relative to said vessel, said surfaces being generally horizontal and arranged one above the other when said vessel is in a generally vertical position to define upper and lower surfaces, said first plurality of members engaging the upper one of said surfaces and the third plurality of members engaging the lower one of said surfaces.

11. The combination set forth in claim 10 wherein said first plurality of members comprising plate means secured to said vessel and having one side engaging said upper surface, said quick attachment and detachment means being mounted on said support member for releasably holding said second plurality of members against the other side of said plate means.

12. The combination set forth in claim 11 wherein said third plurality of members includes a first portion slidably mounted on the lower one of said surfaces and second portion engagable with said vessel and movable means on said vessel and adjacent each of said second portions having a first position for preventing movement of its respective second and third members away from said vessel and a second position permitting sliding movement of its associated third member away from said vessel.

13. The combination set forth in claim 7 wherein at least a pair of said first plurality of members are arranged adjacent said axis and each being on one of the opposite side of said vessel.

14. A metal treating vessel,
support means adjacent said vessel and adapted to be pivoted,
attachment means for securing said vessel to said support means whereby said vessel may be pivoted about a generally horizontal axis, said attachment means including a first plurality of members affixed to and spaced apart on said vessel and engaging a first surface portion of said support means whereby said vessel is supported on said support means, said first plurality of members being unattached relative to said support means for limited sliding movement thereon to permit relative thermal expansion and contraction of said vessel and support means,
a second plurality of members releasably mountable on said support means for preventing movement of said first plurality of members away from said first surface portion and for permitting limited movement of said first members radially relative to said vessel,
securing means for releasably attaching said second plurality of members to said support means,
a third plurality of members movably mounted on said support means for movement into and out of supporting engagement with said vessel at a point displaced axially of said first plurality of members, and locking means for releasably holding said third plurality of members in engagement with said vessel.

15. The combination set forth in claim 14 wherein said first plurality of members each include supported plate means having a first slide slidably engagable with said support means,
said second plurality of members being engagable with an opposite side of said plate means.

16. The combination set forth in claim 15 wherein said support member includes a pair of spaced surfaces extending generally radially relative to said vessel, said surfaces being generally horizontal and arranged one above the other when said vessel is in a generally vertical untilted position to define upper and lower surfaces, the first side of said plate means engaging the upper one of said surfaces and the third plurality of members being slidably mounted adjacent the lower one of said surfaces, and means mounted on said support member for releasably holding said second plurality of members against the other side of said plate means.

17. The combination set forth in claim 16 wherein said third plurality of members includes a first portion slidably mounted on the lower one of said surfaces and a second portion engagable with said vessel and movable means on said vessel and adjacent each of said second portions having a first position for preventing movement of its respective third member away from said vessel and a second position permitting sliding movement of said third member away from said vessel.

18. The combination set forth in claim 17 wherein a pair of said first means are arranged on diametrically opposite sides of said vessel and adjacent said axis, a pair of said third means being located adjacent each of the first means of said pair and on the opposite sides thereof.

19. In apparatus for supporting a metallurgical vessel within a surrounding trunnion support ring having upper and lower surfaces the combination of,
a plurality of attachment means slidably mounted on the lower surface of said trunnion ring for movement into and out of supporting contact with said vessel,
locking means mounted on said vessel for releasably securing said attachment means in its vessel engaging position,
and additional vessel support and restraint means are provided between the upper surface of said trunnion ring and said vessel.

* * * * *